United States Patent
Kruhoffer et al.

(10) Patent No.: US 10,107,333 B2
(45) Date of Patent: Oct. 23, 2018

(54) PLAIN BEARING ASSEMBLY OF A ROTATIONAL ELEMENT ON A BEARING PIN

(71) Applicant: Schaeffler Technologies AG & Co. KG, Herzogenaurach (DE)

(72) Inventors: Wolfram Kruhoffer, Aurachtal (DE); Michael Plogmann, Herzogenaurach (DE); Markus Soyka, Herzogenaurach (DE); Sven Claus, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/545,530

(22) PCT Filed: Jan. 22, 2016

(86) PCT No.: PCT/DE2016/200030
§ 371 (c)(1),
(2) Date: Jul. 21, 2017

(87) PCT Pub. No.: WO2016/119788
PCT Pub. Date: Aug. 4, 2016

(65) Prior Publication Data
US 2017/0356493 A1    Dec. 14, 2017

(30) Foreign Application Priority Data

Jan. 26, 2015   (DE) .................. 10 2015 201 248

(51) Int. Cl.
*F16C 17/02* (2006.01)
*F16C 33/12* (2006.01)
(Continued)

(52) U.S. Cl.
CPC .......... *F16C 33/1055* (2013.01); *F16C 17/02* (2013.01); *F16C 32/0651* (2013.01);
(Continued)

(58) Field of Classification Search
CPC ...... F16C 17/02; F16C 33/043; F16C 33/046; F16C 33/1055; F16C 33/12; F16C 2361/61; F16C 33/1045; F16C 32/0651
(Continued)

(56) References Cited

U.S. PATENT DOCUMENTS 1,591,391 A  *  7/1926  Lundberg .................. F16H 1/20
184/6.12
4,325,589 A      4/1982  Hirt
(Continued)

FOREIGN PATENT DOCUMENTS

DE      2454902 A1  *  6/1976  ......... B22D 11/1287
DE      2702321         7/1978
(Continued)

*Primary Examiner* — Marcus Charles
(74) *Attorney, Agent, or Firm* — Volpe and Koenig, P.C.

(57) ABSTRACT

A plain bearing assembly of a rotational element on a bearing pin, the assembly including a bearing bolt, a bearing sleeve, which is non-rotatably mounted on the pin and which has a first bearing surface formed on its outer circumference, a rotational element which is rotatably mounted on the bearing sleeve and which has a second bearing surface that is formed on its inner circumference and that is slidingly mounted on the first bearing surface. The bearing pin has at least one lubricant channel opening onto the outer side of the pin and the bearing sleeve has a radial groove formed on its inner circumference, which groove communicates with the radial lubricant channel, and at least one opening branching off radially from the radial groove and opening towards the rotational element. The rotational element has a radial groove formed on its inner circumference and communicating with the opening and the first bearing surface is harder than the second bearing surface.

11 Claims, 3 Drawing Sheets

(51) Int. Cl.
*F16C 33/04* (2006.01)
*F16C 33/10* (2006.01)
*F16C 32/06* (2006.01)

(52) U.S. Cl.
CPC .......... *F16C 33/043* (2013.01); *F16C 33/046* (2013.01); *F16C 33/1045* (2013.01); *F16C 33/12* (2013.01); *F16C 2361/61* (2013.01)

(58) Field of Classification Search
USPC ......... 384/95, 291, 129, 166, 316, 385, 293, 384/397, 462; 475/331
See application file for complete search history.

(56) References Cited

U.S. PATENT DOCUMENTS

| | | | | |
|---|---|---|---|---|
| 4,971,459 A * | 11/1990 | McKenna | ............. | F16C 17/028 384/286 |
| 5,567,056 A * | 10/1996 | Blase | ...................... | F02B 39/96 384/115 |
| 8,840,521 B2 * | 9/2014 | Kari | ...................... | F16C 33/203 475/331 |
| 2007/0266811 A1 | 11/2007 | Hagedorn | | |
| 2012/0108380 A1 | 5/2012 | Dinter et al. | | |
| 2012/0114488 A1 | 5/2012 | Giger | | |
| 2014/0034387 A1 * | 2/2014 | Ukonjarvi | ................. | E21B 3/02 175/40 |
| 2014/0291060 A1 | 10/2014 | Feng et al. | | |
| 2015/0345615 A1 * | 12/2015 | Beisel | ................. | F16H 57/0471 74/468 |
| 2016/0298490 A1 * | 10/2016 | Hettinger | ............. | F01D 25/164 |

FOREIGN PATENT DOCUMENTS

| | | | | |
|---|---|---|---|---|
| DE | 20023443 | | 4/2004 | |
| DE | 102009001364 A1 * | | 9/2010 | ................ F16C 9/02 |
| DE | 102010060147 A1 * | | 4/2012 | ........ F16H 57/0482 |
| DE | 102010054869 A1 * | | 6/2012 | ........ F16H 57/0479 |
| DE | 102012223234 A1 * | | 6/2014 | ........... F16H 57/082 |
| EP | 1857712 | | 11/2007 | |
| EP | 2383480 | | 11/2011 | |

* cited by examiner

PLAIN BEARING ASSEMBLY OF A ROTATIONAL ELEMENT ON A BEARING PIN

CROSS REFERENCE TO RELATED APPLICATIONS

This application claims priority to German Application 10 2015 201 248.4, filed Jan. 26, 2015.

BACKGROUND

The invention relates to a plain bearing arrangement of a rotating element on a bearing pin, comprising a bearing pin, a bearing sleeve arranged locked in rotation on this pin with a first running surface formed on the outer circumference, and a rotating element supported on the bearing sleeve so that it can rotate with a second running surface that is formed on the inner circumference and is supported so that it can slide on the first running surface.

Rotating supports based on plain bearings can be used in a wide range of applications. What they have in common is always the sliding support of a rotating element, e.g., of a gearwheel, on a bearing pin. One example here is the support of a planetary gear on a planetary gear pin of a planetary gear drive. Planetary gear drives can be used in a wide range of different applications. Increasingly, very large dimensioned planetary gear drives are also being built, for example, for use in wind turbines. In such large drives, the longevity of the drive is very important, in particular, because it is not easy to replace the gear components without additional measures.

It is known to support the planetary gears on the corresponding planetary gear pins of the drive via plain bearings; see, for example, EP 2 383 480 B1. To design this plain bearing to be as wear-resistant as possible, one of the plain bearing parts, for example, a bearing sleeve on the planetary gear pin, is made from a plain bearing material and a special channel geometry for enabling a lubricant supply of the plain bearing area is provided, comprising an axial supply channel that feeds the planetary gear pin and from which one or more radial channels branch out that in turn communicate with openings in the plain bearing sleeve on the planetary gear pin. These openings open into lubricant pockets formed on the outer circumference of the bearing sleeve from which the lubricant, typically, oil, enters into the lubricant gap. On the bearing sleeve, there is also a groove that is provided on the outer side and runs in the axial direction and is used as a lubricant collection groove. The planetary gear runs with its typically non-profiled, cylindrical running surface on the bearing sleeve formed as described accordingly and profiled in the running surface area from the plain bearing material.

SUMMARY

The invention is based on the objective of defining a plain bearing arrangement, especially for a planetary gear of a planetary gear drive, which is extremely wear-resistant and thus has a long service life, but simultaneously can also be easily manufactured.

To achieve this objective, in a plain bearing arrangement of the type specified above, it is provided according to the invention that the bearing pin has at least one lubricant channel opening on the outer side of the pin, the bearing sleeve has a radial groove formed on the inner circumference and communicating with the radial lubricant channel and at least one opening branching radially from this groove and opening toward the rotating element, and the rotating element has a radial groove formed on the inner circumference and communicating with the opening, wherein the first running surface is harder than the second running surface.

Such a rotating element is, in particular, but not necessarily, a planetary gear, a bearing pin, in particular, but not necessarily, a planetary gear pin, i.e., the plain bearing arrangement is part of a planetary gear drive. Although a planetary gear and a planetary gear pin are discussed below, these terms stand synonymously for the general terms of rotating element and bearing pin.

The invention is distinguished by a special lubricant supply and different design of the running-surface hardness of the friction partners. As described, the first running surface, that is, the bearing-sleeve-side running surface, is harder than the second running surface on the rotating element, e.g., the planetary gear. In other words, the bearing sleeve or the second running surface is more wear-resistant than the rotating element or its running surface. Thus, there is a defined difference between a nearly wear-resistant first running surface or wear-resistant bearing sleeve according to its running surface hardness and the less wear resistant rotating element, e.g., the planetary gear which is typically produced from hardened steel. The bearing-sleeve-side first running surface has a harder design accordingly; it can also have a certain toughness. A contour change caused by wear is not to be expected on the bearing-sleeve side, even under mixed friction. Wear occurs only on the less wear-resistant rotating element, typically made from soft or heat-treated, but preferably hardened steel. Because the rotating element rotates and is loaded circumferentially under a stationary load, the wear is uniform around the circumference. Due to this circumferential wear on the moving rotating element, the wear causes only a change in the positional clearance over a long operating time, which has only a very minimal effect on the bearing operation, but does not cause a change in the contours, that is, the circular cylindrical geometry is maintained even if there is wear.

For the use of a very wear-resistant material on the bearing sleeve, very high surface pressures can be transferred in the plain bearing. To provide for a good construction of the lubricating film or the lubricating film pressure in the bearing gap, a reliable lubricant supply, typically oil supply, is important. For this purpose, on the pin side there is a lubricant channel opening on the outer side of the pin. For example, an axial lubricant channel and at least one lubricant channel branching off from this in the radial direction is provided that runs to the bearing sleeve. This has, on its inner circumference, a radial groove that communicates with the radial pin-side lubricant channel. This radial groove is used as a lubricant collection groove. From this radial groove extends at least one opening that opens toward the rotating element to the first running surface, so that lubricant can reach from the radial groove into the running-surface area. In addition, now another radial groove formed on the inner circumference and therefore incorporated into the second running surface and communicating with the bearing-sleeve-side opening is provided on the rotating element, that is, on the component basically subject to wear. In other words, according to the invention, the softer second running surface is provided with a radial groove, while the harder first running surface has no such radial groove. The rotating-element-side radial groove enables an improved lubricant supply. Lubricant collects in it and is carried along to the part due to the movement of the rotating element and can also flow out from this radial groove into the narrowest region, if lubricant is needed there, for example, due to the dynamic characteristics of the bearing. The bearing is thus better supplied with sufficient cooling lubricant, because the rotating element has basically its own lubricant reservoir formed by the radial groove or the lubricant is provided close to the area that is highly loaded.

The radial groove provided on the rotating element can be formed directly in the rotating element or the running surface formed directly on it. However, it can also be formed by two sleeves pressed into the rotating element and spaced apart in a defined way in the axial direction for forming the radial groove and which then form the rotating-element-side running surface. The groove cross section can be arbitrary, e.g., rectangular, trapezoidal, rounded, semicircular, countersunk, or the like.

In addition, as described, any wear takes place almost exclusively on the side of the softer rotating element. In other words, due to the movement of the rotating element, circumferential surface wear occurs uniformly on both sides of the radial groove. The formation of any edges that were caused by wear and would limit axial movement of the rotating element is not given in this case. This would be different if the radial grooves were not provided on the rotating element, but instead were provided on the bearing sleeve as in the prior art. This is because the bearing sleeve is the wear-resistant component. In this case, the rotating element would now become basically "buried" in the bearing-sleeve-side radial groove due to the wear, that is, edges would be created on the running-surface side of the rotating element, which would limit the axial movement. This is, however, advantageously prevented by the construction of the radial groove on the rotating element.

In addition, a simpler production of the rotating element often with large dimensions is given, in particular, in the form of a planetary gear, by the construction of the radial groove on the rotating element or the planetary gear itself. This then makes it possible to process the running surface or the inner circumference of the rotating element from both sides and, in particular, from the end face up to the respective radial groove edge. With respect to the size of a planetary gear to be designed, for example, for a wind turbine, with a running surface width of, e.g., 20 cm or more, it is problematic to produce the running surface without offsets or edges, especially if the planetary gear has to be shifted. This is no longer the case in the present arrangement, because the running surface is already divided by the radial groove and processing from the end side of the planetary gear toward the groove edge is possible without additional measures.

Preferably, two radial lubricant channels arranged offset to each other circumferentially are provided, which communicate with the radial groove of the bearing sleeve, wherein the lubricant channels are preferably offset by 180° relative to each other.

In addition, preferably two bearing-sleeve-side openings arranged offset relative to each other circumferentially are also provided. These are preferably offset relative to each other by 180°, wherein they are preferably aligned in the installation position of the bearing sleeve on the bearing pin, but not necessarily directly with the respective pin-side radial lubricant channel. They are preferably also arranged 90° offset to the load zone, so that the lubricant passage is through the opening accordingly at an angle before the load zone, where the lubricant gap is at the narrowest, and consequently the lubricant is pulled in each case into the lubricant gap that becomes narrower and narrower.

Preferably, the opening or each bearing-sleeve-side opening opens into a lubricant pocket formed in the first running surface and extending axially. By means of this lubricant pocket in which the lubricant naturally also collects, a relatively wide supply zone viewed axially is given by means of which the lubricant is led into the running surface area. The lubricant pocket that is preferably constructed as an axial groove should extend over at least half the width of the first running surface, preferably also more, wherein for the design of the groove length it must be ensured that the axial groove is always overlapped by the second running surface independent of the axial position of the rotating element.

In one refinement of the invention it can also be provided that two axial bearing washers arranged locked in rotation with respect to the bearing pin and against which the axial moving rotating element contacts are provided and that from the bearing-sleeve-side radial groove, that is, the radial groove open toward the bearing pin, an axial groove that opens at the respective end side of the bearing sleeve branches toward each axial end side of the bearing sleeve. The lubricant at that location can be used to feed lubricant selectively to the axial plain bearing. As described, the plain bearing arrangement has two axial bearing washers against which the rotating element contacts, that is, supported axially. Such an axial bearing arrangement is typically provided in the planetary gear drive. Naturally, a lubricant supply of this axial bearing area is already given such that lubricant is led into the bearing gap of the radial bearing from which it is also pressed laterally because this becomes narrower and narrower toward the load zone, so that it is led into the axial bearing area. Nevertheless, it is useful to also realize a defined axial bearing lubrication, wherein the two bearing-sleeve-side axial grooves are used. By means of these grooves, lubricant fed from the bearing pin is fed into the radial groove formed open relative to the pin and constructed on the inner circumference of the bearing sleeve and is led directly into the axial bearing washer, so that it is led from there into the actual friction area.

Here, the two axial grooves can be aligned with each other or offset relative to each other circumferentially. In each case, they are positioned circumferentially so that they are positioned offset to the location of the minimum lubricant gap, that is, the actual load zone. Preferably, a cut in the end face of the bearing sleeve must be provided in the area of the axial grooves at their ends to improve the inflow of the oil into the sliding area.

The bearing sleeve itself can be a one-piece component; however, it can also be made from two axially adjacent bearing-sleeve sections. The bearing sleeve is, as described, the wear-resistant part, wherein the bearing sleeve is processed accordingly and is provided, in particular, for forming the first running surface with a corresponding hard material coating. If the drive is smaller, a one-piece bearing sleeve can be used that can be coated depending on the size as a one-piece component in a coating system. For larger bearing sleeves, the use of a multi-part bearing sleeve is recommended, because the individual bearing-sleeve sections can be provided in the coating system separately with the running surface coating and incidentally also components with smaller extent in the axial direction can be processed, for example, ground or honed. If a two-part bearing sleeve is used, the bearing-sleeve sections can be fixed in different ways, for example, by the use of pins, screws, or the like, with a non-positive-locking, positive-locking, or material-bonding connection on the planetary pin itself.

In the case of a two-part bearing sleeve, the separating plane is preferably in one of the groove flanks of the bearing-sleeve-side radial groove. Here, care must be taken to provide the exact positioning of the bearing-sleeve sections. Their arrangement can be realized, e.g., with a positive-locking connection.

As described, the bearing sleeve is preferably provided with a corresponding wear-resistant hard material coating for forming the harder running layer. Such a hard material layer could be, for example, a carbon layer, also often called a DLC layer (DLC=diamond like carbon). It can also be optionally doped with a metal, in this case, this would be a so-called Me-DLC layer, wherein, in particular, tungsten carbide (WC) is used as the dopant. Furthermore, the hard material layer could be a ceramic layer or a ceramic-like layer (e.g., nitride ceramic, oxide ceramic, or carbide ceramic, e.g., silicon nitride, silicon carbide, or nitrides or carbides of metals, such as titanium, chrome, or their mixed phases). Combination layers made from carbon and ceramic layers are also conceivable.

The hard material layer should have a Vickers hardness HV of at least 800 HV, preferably the Vickers hardness should be at least 1500 HV. The hardness of the second running surface on the rotating element, e.g., the planetary gear, is lower, as described, it should be a maximum 800 HV. Preferably, the first running surface, that is, the hard material layer, has at least twice and up to three-times the hardness of the allocated surface layer or running surface of the rotating element.

The bearing-sleeve-side hard material layer is preferably applied on a bearing sleeve substrate with an edge hardness of at least 50 HRC. The thickness of the hard material layer is preferably less than 20 μm, preferably it is in the range between 1-10 μm, and especially in the range between 2.5-4 μm.

A hard diamond like coating, like the material that is known by the trade name "Triondur®" from the applicant, e.g., "Triondur® CX+" has proven to be especially suitable.

The plain bearing arrangement according to the invention consequently provides, on one hand, the integration of a defined tribological running surface system and, on the other hand, also a special construction of the lubricant supply, especially in the area of the running surfaces, that is, the radial support, but also with respect to the axial bearing.

As described, the rotating element is, in particular, a planetary gear and the bearing pin is, in particular, a planetary gear pin, both part of a planetary gear drive. The invention therefore also relates, in particular, to a planetary gear drive comprising at least one plain bearing arrangement described above.

BRIEF DESCRIPTION OF THE DRAWINGS

Additional advantages and details of the invention are given from the embodiments described below and with reference to the drawings. Shown are.

DETAILED DESCRIPTION

In the figures, a plain bearing arrangement of a planetary gear drive is described as an example, comprising a planetary gear (=rotating element) and a bearing pin (=planetary gear pin), wherein the planetary gear is supported on a bearing sleeve set on the planetary gear pin so that it can slide.

Figure 1:
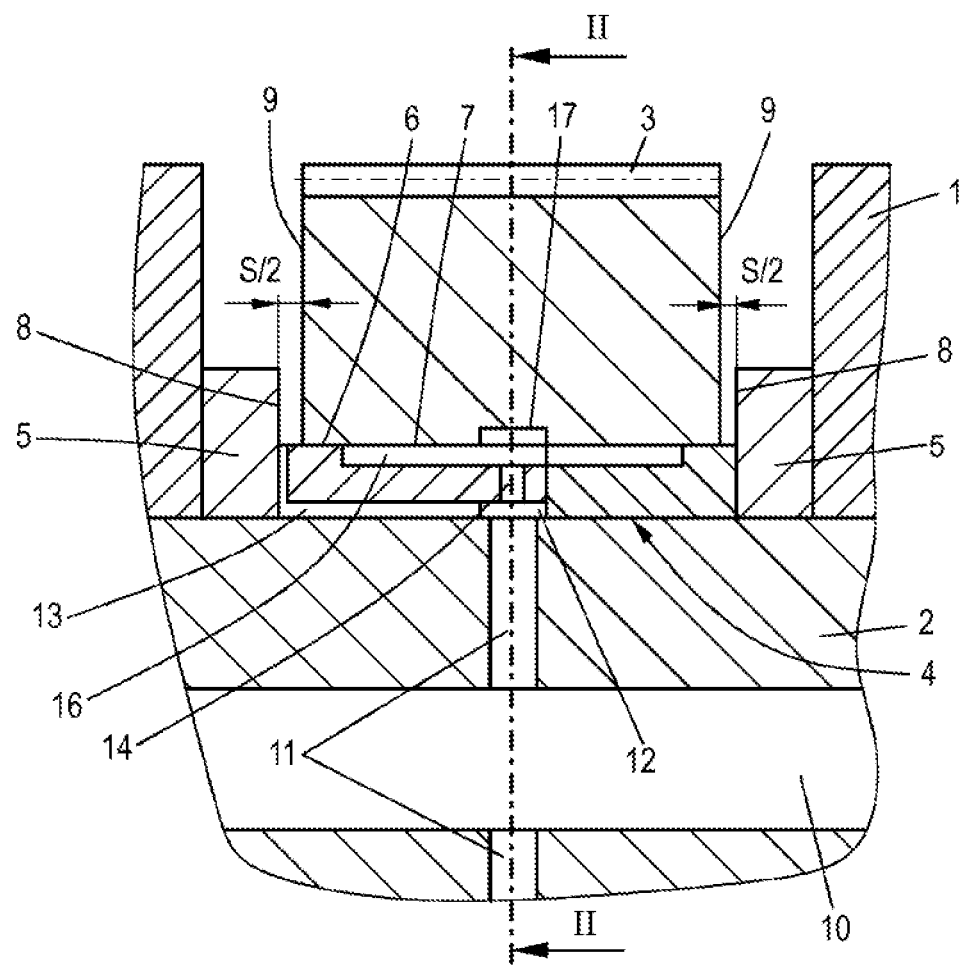
FIG. 1 a plain bearing arrangement according to the invention in a section view as partial view of a planetary gear drive, FIG. 2 a section view in the direction of the line II-II from FIG. 1, FIG. 3 a partial view in cross section of a one-part bearing sleeve of a first embodiment, FIG. 4 a partial view in cross section of a one-part bearing sleeve of a second embodiment, FIG. 5 a partial view in cross section of a divided bearing sleeve, and FIG. 6 a partial view as a top view on the bearing sleeve from FIG. 5.

FIG. 1 shows, in the form of a partial view, a cut-out from a planetary gear drive comprising a plain bearing arrangement according to the invention. On a planetary gear carrier 1 there is a planetary gear pin 2 forming a bearing pin that is used as a bearing axis for a planetary gear 3 forming a rotating element. On the planetary gear pin 2 there is a bearing sleeve 4 that is connected locked in rotation to the planetary gear pin 2. The bearing sleeve 4 is mounted on the planetary gear pin 2, for example, with a non-positive-locking, positive-locking, or material-bonding connection. Two axial bearing washers 5 that are fixed on their part on the pin side and planetary-gear-carrier side, respectively, are arranged on both sides of the bearing sleeve 4. They are used as axial thrust washers for the planetary gear 3 that moves slightly in the axial direction.

The bearing sleeve 4 has, on its outer surface, a first running surface 6 that is formed by a hard material layer that was applied, for example, in a PVD method. It has a hardness of at least 1500 HV. Preferably it is a DLC layer. On this first running surface 6, the planetary gear 3 that has, on its side, a second running surface 7 that has a significantly lower surface hardness, for example, a maximum hardness of 800 HV. It follows from these differences in hardness that the bearing sleeve 4 or its first running surface 6 is wear-resistant relative to the second running surface 7 of the planetary gear 3 that is subject to wear. If wear occurs, this takes place exclusively on the planetary gear 3. However, because the planetary gear 3 rotates about the planetary gear pin 2 and thus also about the bearing sleeve 4, a uniform circumferential wear is produced, so that the radial wear volume is extremely low overall and also exhibits only a minimal change in the bearing clearance over a long period of time.

The axial support is realized by use of the axial bearing washers 5, each of which have axial bearing surfaces 8 against which the planetary gear 3 contacts with its respective end face 9. A stepped surface can also be formed instead. It is also conceivable to integrate a corresponding tribological system in this area, for example, in that the axial bearing washers 5 likewise have a corresponding hard material coating in the area of their bearing surfaces 8.

Figure 2:
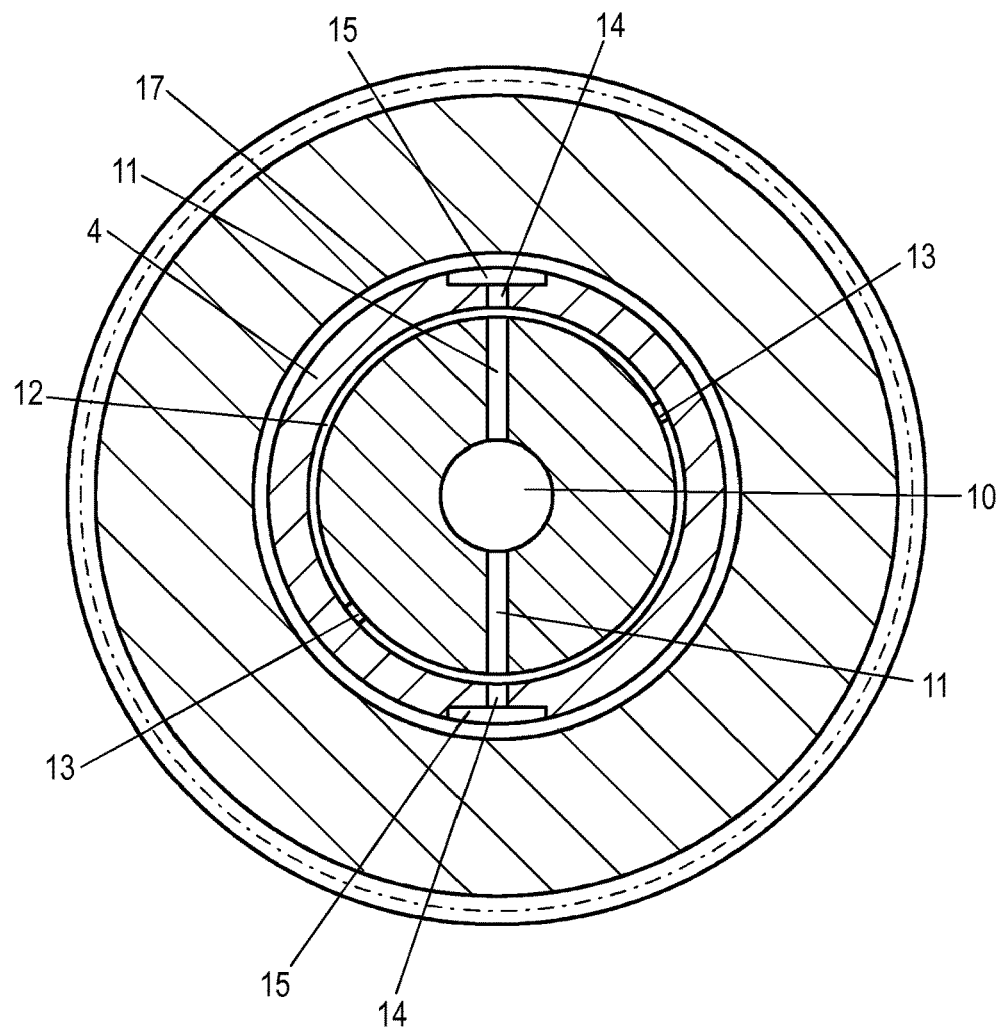

In order to enable a good supply of lubricant to both the radial bearing area formed by the running surfaces 6 and 7 and also to the axial bearing area formed by the bearing surfaces 8 and the end faces 9, a corresponding lubricant channel system is provided. This comprises an axial lubricant channel 10 formed in the planetary gear pin 2 and arranged in the pin center and branching out from the two radial lubricant channels 11, see here also FIG. 2. A radial groove 12 that is open toward the planetary gear pin 2 and communicates with the two lubricant channels 11 is formed on the bearing sleeve 4 on the inner circumference. With this arrangement, lubricant, that is, oil, is fed into this circumferential radial groove by these channels. Axial grooves 13 that run toward the two end faces of the bearing sleeve 4 and open at these ends branch away from this radial groove 12 in the shown example. FIG. 1 shows one of these two axial grooves 13 that runs in the example shown there toward the left axial bearing. The other axial groove 13 that runs to the right axial bearing is formed offset circumferentially. FIG. 2 shows, as an example, the different position of the two axial grooves. Obviously, it would also be conceivable to let each axial groove 13 run to both sides of the bearing sleeve 4. Each angle offset is selected so that the axial grooves 13 are located at a distance to the actual load zone, that is, the location of the minimum lubricant gap between the running surfaces 6 and 7.

By use of the axial grooves 13, lubricant reaches directly onto the axial bearing disks 5 and the minimum lubricant gap given between the planetary gear 3 and the axial bearing washers 5 in the contact area of the end faces 9 of the planetary gear 3 on the bearing surfaces 8. In this way, additional lubrication is given if this area is not already supplied by lubricant pressed out from the lubricant gap between the running surfaces 6 and 7.

For supplying the running surfaces or the lubricant gap, two openings 14 are provided on the bearing sleeve 4, wherein these openings open into a lubricant pocket 15 formed on the outer side of the bearing sleeve. By these openings 14 that can be constructed as drilled holes or elongated holes, lubricant comes from the radial groove 12 into the lubricant pocket 15, which is preferably constructed as an axial groove 16—see FIG. 1. This axial groove 16 extends over at least half the first running surface 6. It is dimensioned so long that it extends as far as possible over the second running surface 7 under consideration of the axial clearance of the planetary gear 3, so that the running surface 7 is wetted over the largest possible surface area or lubricant is pulled into the lubricant gap via the running surface 7.

On the planetary gear 3 in which the second running surface 7 is formed, there is also a radial groove 17 that is also arranged essentially centrally viewed in the axial direction—this also applies to the radial groove 12 and the openings 14. This radial groove 17 is used as a lubricant collection groove, that is, the circumferential gear 3 always moves a lubricant reservoir with itself. When necessary, lubricant can also flow out of this radial groove 17 into the narrowest area of the bearing gap if lubricant is needed there for dynamic reasons.

As described, the planetary gear 3 is, in the area of its running surface 7, the wear part. If wear occurs, which is only very low, if at all, as described, no edges or burrs caused by the wear are formed due to the integration of the radial groove 17 on the planetary gear 3, because the running surface 7 wears completely uniformly on both sides of the radial groove 17 and because the first running surface 6 of the bearing sleeve 4 has no profile—apart from the profiling by the axial groove 16—otherwise also preferably, but not necessarily. Because it is the harder component, it determines the wear geometry. In other words, overall a homogeneous, uniform circumferential wear is produced without any edge formation that would restrict axial movement of the planetary gear 3.

The planetary gear 3 can move slightly viewed in the axial direction, see FIG. 1, as is indicated by the clearance indication S/2.

Figure 3:
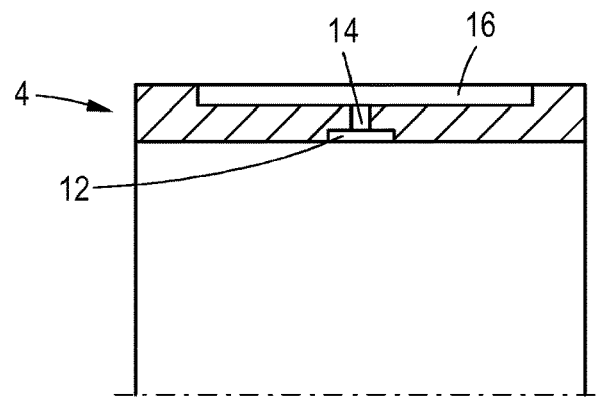

FIG. 3 shows a first embodiment of a bearing sleeve 4 that is constructed here in one part. Shown is the radial groove 12, the opening 14, and the axial groove 16. In this construction, in the example, no axial groove 13 is provided, these do not have to be realized as stated, because a good supply to the two-sided axial bearing is already given by the lubricant forced out from the lubricant gap.

Figure 4:
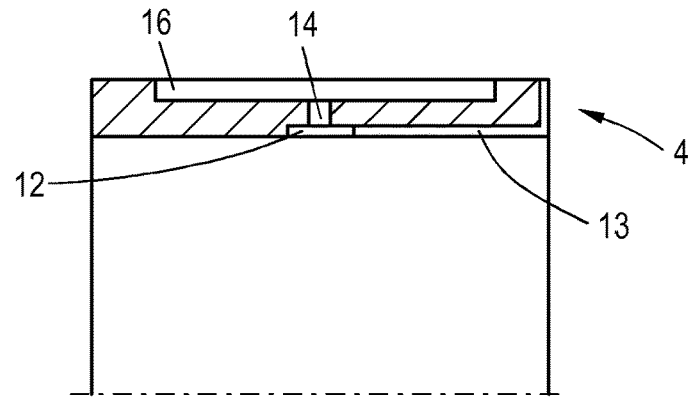

In contrast, FIG. 4 shows an embodiment of the bearing sleeve 4 that has an axial groove 13. Otherwise, the construction of the bearing sleeve 4 corresponds to that from FIG. 3. The axial groove 13 can also be guided in the direction of or up to the opposite end face of the bearing sleeve 4.

Figure 5:
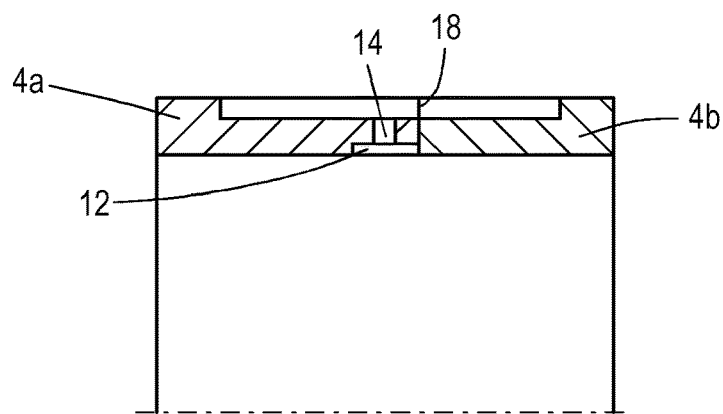
Figure 6:
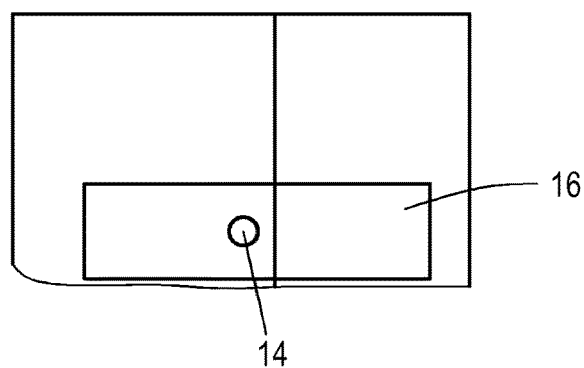

FIGS. 5 and 6 finally show an embodiment of the bearing sleeve 4, like the comparable arrangement shown in FIG. 1. This involves a two-part bearing sleeve including the two bearing-sleeve sections 4a and 4b that connect axially to each other. The separating plane 18 runs along a flank of the radial groove 12 viewed in the radial direction. The two bearing-sleeve sections 4a, 4b can be fixed to each other by connectors, such as screws or pins, but they can also be arranged in a fixed position relative to each other by their respective fixing on the planetary gear pin 2.

The top view from FIG. 6 is finally the position of the opening 14 in the axial groove 16 that extends in the shown example over far more than three-quarters of the bearing sleeve length. The length of the axial groove 16 is always dimensioned so that, under consideration of the axial play of the planetary gear 3, the axial groove 16 is always covered by the running surface 7.

FIGS. 5 and 6 differ from the construction of the bearing sleeve 4 according to FIG. 1 in that the bearing sleeve 4 from FIG. 1 still has the two axial grooves 13, of which only one is shown in FIG. 1. In other words, the two-part bearing sleeve can also be constructed with or without axial grooves.

LIST OF REFERENCE NUMBERS

1 Planetary gear drive
2 Planetary gear pin
3 Planetary gear
4 Bearing sleeve
4a Bearing-sleeve section
4b Bearing-sleeve section
5 Axial bearing washer
6 Running surface
7 Running surface
8 Bearing surface
9 End face
10 Lubricant channel
11 Lubricant channel
12 Radial groove
13 Axial groove
14 Opening
15 Lubricant pocket
16 Axial groove
17 Radial groove
18 Separating plane
S/2 Clearance specification

The invention claimed is:

1. A plain bearing arrangement comprising:
   a bearing pin,
   a bearing sleeve arranged locked in rotation on said bearing pin with a first running surface formed on an outer circumference,
   a rotating element on the bearing pin and rotatably supported on the bearing sleeve, the rotating element having a second running surface formed on an inner circumference that is slidably supported on the first running surface,
   the bearing pin has a radial lubricant channel opening on an outer side of the bearing pin, the bearing sleeve has a radial groove formed on the inner circumference and communicating with the radial lubricant channel and at least one opening open toward the rotating element and branching radially from the groove, and the rotating element has a radial groove formed on the inner circumference and communicating with the opening and the first running surface is harder than the second running surface.

2. The plain bearing arrangement according to claim 1, wherein the radial groove provided on the rotating element is formed directly in the rotating element.

3. The plain bearing arrangement according to claim 1, wherein the radial groove has a rectangular, trapezoidal, rounded, or semicircular cross section.

4. The plain bearing arrangement according to claim 1, wherein the bearing-sleeve-side opening opens into an axially extending lubricant pocket formed in the first running surface.

5. The plain bearing arrangement according to claim 4, wherein the lubricant pocket is constructed as an axial groove that extends over at least half a width of the first running surface.

6. The plain bearing arrangement according to claim 1, further comprising two axial bearing washers arranged locked in rotation on the bearing pin and against which the axially moving rotating element contacts, and at least one axial groove that opens at a respective end side of the bearing sleeve branches from the bearing-sleeve-side radial groove to a respective end side of the bearing sleeve.

7. The plain bearing arrangement according to claim 6, wherein there are two of the axial grooves that are aligned with each other or are arranged offset circumferentially relative to each other.

8. The plain bearing arrangement according to claim 1, wherein the bearing sleeve is a one-part component.

9. The plain bearing arrangement according to claim 1, wherein a separating plane is located on a groove flank of the bearing-sleeve-side radial groove.

10. The plain bearing arrangement according to claim 1, wherein the harder running surface of the bearing sleeve is formed by a hard material coating.

11. The plain bearing arrangement according to claim 1, wherein the bearing sleeve is comprised of two bearing-sleeve sections connecting to each other in an axial direction.

* * * * *